73652    S. J. Rockwood's Candlestick
PATENTED
JAN 21 1868
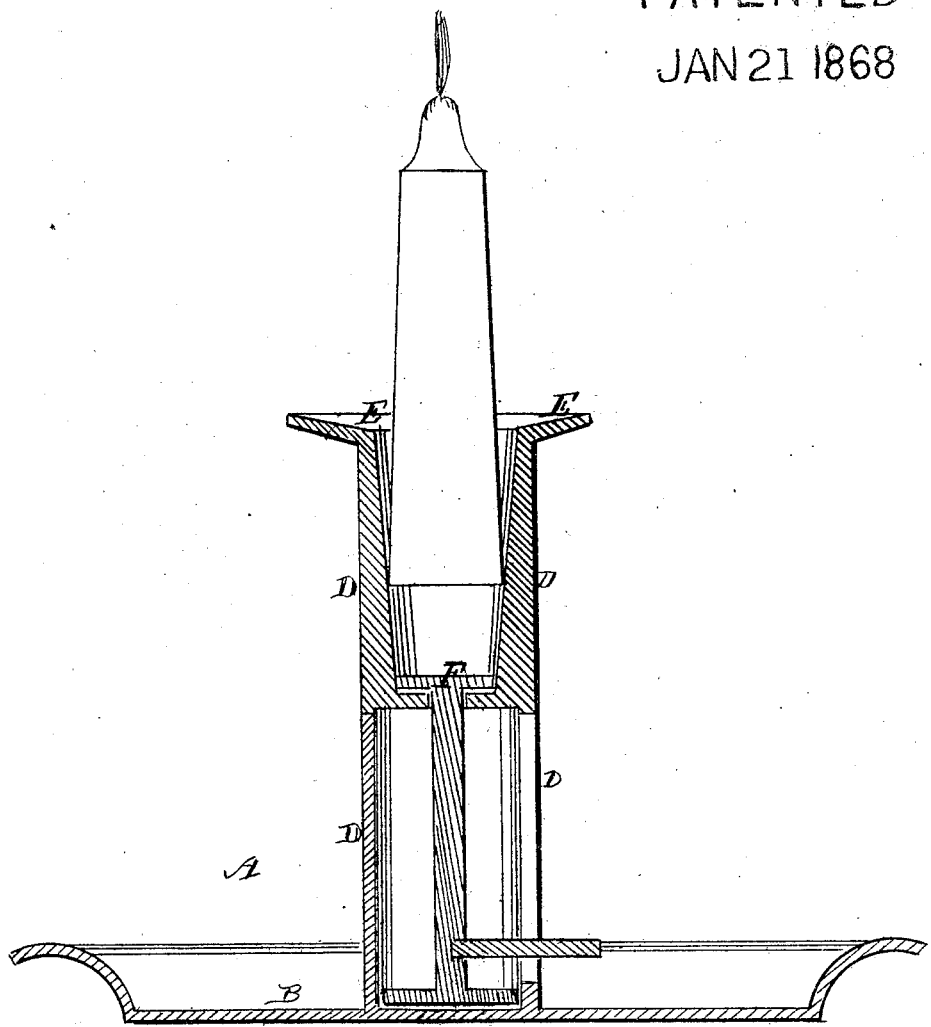
Witnesses
Theo Tusche
Wm Spewn
Inventor
S J Rockwood
Per Munn & Co
Attorneys

United States Patent Office.

S. J. ROCKWOOD, OF ELSAH, ILLINOIS.

Letters Patent No. 73,652, dated January 21, 1868.

IMPROVED CANDLESTICK OR HOLDER.

The Schedule referred to in these Letters Patent and making part of the same.

TO ALL WHOM IT MAY CONCERN:

Be it known that I, S. J. ROCKWOOD, of Elsah, in the county of Jersey, and State of Illinois, have invented a new and "Improved Candle-Holder;" and I do hereby declare that the following is a full, clear, and exact description thereof, which will enable those skilled in the art to make and use the same, reference being had to the accompanying drawings, forming part of this specification.

The object of the present invention is to construct a holder for a candle, in such a manner that it will receive and hold candles of varying sizes, whether large or small in diameter, and without either cutting or wrapping up the candles; and, for this purpose, the invention consists in making the socket of the holder, in which the candle is placed, of a conical or tapering shape, from end to end, with its larger end at the mouth.

In the accompanying plate of drawings my improved candle-holder is illustrated, the figure being a central vertical section through the same.

A, in the drawings, represents a holder for candles, made according to the present invention, of which B is its plate or disk, having a side handle, and D the upright tube or socket to receive the candlestick. This tube is fixed in position, and upon its inside, from its mouth or open end E, down and toward the disk B, it is made of a conical or tapering shape, so that, whatever may be the diameter or size of the candle, it will at some point come to a stop, and be firmly held in position, without requiring to be wrapped around with paper if small, or cut or chopped away, if large. F, a pusher, arranged on socket D, so as to be moved up and down therein, through a thumb-piece, G, and to thus throw out the candlestick, when so desired.

I claim as new, and desire to secure by Letters Patent—

The conical or tapering-shaped socket or tube D, for holding a candle, substantially as and for the purpose described.

S. J. ROCKWOOD.

Witnesses:
   B. L. MOTT,
   JOSEPH WRONKER.